United States Patent [19]

Kuc, Sr.

[11] Patent Number: 6,129,877
[45] Date of Patent: Oct. 10, 2000

[54] METHOD AND SYSTEM FOR FABRICATING ELASTOMERIC ARTICLES

[76] Inventor: John Kuc, Sr., Twin Elks Farm, 650 Pusey Mill Rd., Lincoln University, Pa. 19352

[21] Appl. No.: 09/148,145

[22] Filed: Sep. 4, 1998

[51] Int. Cl.$^7$ .................................................. B29C 47/88
[52] U.S. Cl. ..................... 264/210.2; 264/210.6; 264/284; 264/920; 264/211
[58] Field of Search ................ 264/920, 37.32, 264/210.2, 210.6, 284, 293, 151, 176.1, 211; 524/76

[56] References Cited

U.S. PATENT DOCUMENTS

| | | |
|---|---|---|
| 2,409,437 | 10/1946 | LaCrosse . |
| 2,461,193 | 2/1949 | Banbury et al. . |
| 3,386,925 | 6/1968 | Dillhoefer . |
| 3,950,480 | 4/1976 | Adam et al. . |
| 3,991,005 | 11/1976 | Wallace . |
| 4,028,288 | 6/1977 | Turner . |
| 4,110,420 | 8/1978 | Turner . |
| 4,244,841 | 1/1981 | Frankland . |
| 4,324,710 | 4/1982 | Davis et al. . |
| 4,329,309 | 5/1982 | Kelly . |
| 4,795,603 | 1/1989 | Nagayasu . |
| 5,114,648 | 5/1992 | Kuc . |
| 5,312,573 | 5/1994 | Rosenbaum et al. . |
| 5,677,354 | 10/1997 | Oliveira Da Cunha Li . |
| 5,731,358 | 3/1998 | Pillai . |
| 5,925,296 | 7/1999 | Leese . |

*Primary Examiner*—Jan H. Silbaugh
*Assistant Examiner*—Mark Eashoo
*Attorney, Agent, or Firm*—Rosenberg, Klein & Lee

[57] ABSTRACT

A method and system is provided for fabricating an elastomeric article, and comprises the steps of: providing a predetermined quantity of a comminuted rubber composition; heating the comminuted rubber composition to a predetermined processing temperature which effects at least a partial devulcanization thereof; forming a homogeneous dispersion by combining with that rubber composition a predetermined quantity of an additive composition; mixing with the homogeneous dispersion a predetermined quantity of a plastic composition and heating the resulting mixture to a predetermined extruding temperature to form a viscous compound composition; and, mechanically processing the viscous compound composition to form the elastomeric article. A system incorporating the method generally comprises a surge bin (20); a heated conveyor assembly (30) coupled to the surge bin (20); a mechanism (40) coupled to the heated conveyor assembly (30) for introducing a predetermined quantity of an additive composition; an extruder assembly (70) operably coupled to the heated conveyor assembly (30); and, a roll mold assembly (90) operably coupled to the extruder assembly (70).

10 Claims, 3 Drawing Sheets

METHOD AND SYSTEM FOR FABRICATING ELASTOMERIC ARTICLES

BACKGROUND OF THE INVENTION

1. Field of the Invention

The subject method and system for fabricating elastomeric articles is generally directed to the fabrication of articles from scrap or waste rubber products, scrap or waste plastic products, and selected additive compositions. More specifically, the subject method and system is directed to the fabrication of a substantially finished product contemporaneously with the material compounding process necessary to prepare the scrap or waste rubber products for use in such final product fabrication. The subject method and system provides for the pre-processing of rubber-containing feedstock to form a viscous elastomer compound followed by a substantially contemporaneous roll molding of the viscous elastomer compound as it is formed.

With the need to conserve natural resources and reduce the generation of waste products becoming evermore apparent, the need to productively utilize scrap or recyclable waste materials has become equally apparent. The need for such productive utilization of scrap or waste materials is particularly great in the case of materials containing rubber or the like for which safe and effective disposal means are not presently available. Consequently, much focus has been placed on fabricating useful articles from scrapped or recycled rubber-containing materials.

One type of such rubber-containing material is commonly referred to as 'crumb rubber' which results from the comminution of scrap or recycled vulcanized rubber tire materials. As the typical end product of tire recycling operations, crumb rubber is widely available commercially for use as feedstock in various fabrication/production processes.

The typical approach in forming elastomeric articles is to introduce into an injection molding process a thermoplastic resin which cures within a mold of preselected contour and configuration. The thermoplastic resin is invariably the product of its own manufacturing process and, in most applications, is commercially procured in compounded pellet form. Significant time and expense is unnecessarily consumed by employing separate manufacturing processes for compounding a feedstock into a molding process-ready thermoplastic resin and forming a molded elastomeric article by use of that thermoplastic resin. The inefficiency becomes even greater where a specially-formulated thermoplastic resin is procured for use in the molding process.

The crumb rubber material is not only available in great abundance, its constituents possess similar, if not identical, material compositions. For those reasons, crumb rubber material serves well as feedstock in forming a thermoplastic resin material. The inefficiencies in prior art approaches noted above are minimized, then, in accordance with the teachings of the present invention whereby crumb rubber or a like rubber composition is consumed as feedstock in a process wherein the necessary compounding of the feedstock into a thermoplastic resin material is accompanied by a substantially contemporaneous molding process that yields an article having a preselected contour and configuration.

2. Prior Art

Processes for molding a pre-processed rubber composition as feedstock in fabricating a molded elastomeric article are known in the art. Various pre-processing techniques for processing crumb rubber into a compounded form are also known in the art. The best prior art known to Applicant includes U.S. Pat. Nos. 5,114,648; 4,795,603; 4,244,841; 4,110,420; 4,028,288; 3,991,005; 3,386,925; 2,461,193; and, 2,409,437. This prior art, however, fails to disclose a method or system which receives as its feedstock unaltered crumb rubber and generates as its end product an elastomeric article molded essentially to its final contour and configuration.

For instance, U.S. Pat. No. 5,114,648 issued to Applicant is directed to a method of producing thermoplastic resin products. The disclosed method generates as its final product a pelletized resin compound, not an elastomeric article in its final configuration. While the method operates on a rubber-containing feedstock material, the method's end product is adapted for subsequent utilization in a separate molding process. There remains a prevailing need for a method and system wherein a recyclable material such as a scrap or waste rubber composition is consumed as feedstock, and wherein the pre-processing of the scrap or waste rubber composition and the fabrication of an elastomeric article resulting therefrom is contemporaneously performed in sufficiently efficient, inexpensive, and simple manner.

SUMMARY OF THE INVENTION

It is a primary object of the present invention to provide a method and system for forming an elastomeric article of preselected contour and configuration from a feedstock material containing recyclable scrap or waste rubber composition.

It is another object of the present invention to provide a method and system for performing the necessary pre-processing of an unaltered rubber-containing feedstock material and molding of the pre-processed material into an elastomeric article having a preselected contour and configuration in a substantially continuous sequential manner.

It is yet another object of the present invention to provide a method and system for substantially contemporaneously molding a viscous thermoplastic compound into an article of preselected contour and configuration upon formation of that thermoplastic compound through pre-processing of a rubber-containing feedstock material.

These and other objects are attained in the subject method and system for fabricating elastomeric articles. The subject method comprises the initial step of providing a predetermined quantity of a comminuted rubber composition as feedstock. This feedstock is heated to a predetermined processing temperature for at least a partial devulcanization thereof. A homogeneous dispersion is formed by combining with the rubber composition a predetermined quantity of an additive composition. The homogeneous dispersion is mixed with a predetermined quantity of a plastic composition and heated to a predetermined extruding temperature to form a viscous compound composition. The viscous compound composition is then mechanically processed to form the elastomeric article. In an embodiment of the subject method, the viscous compound composition is extruded to form a substantially planar pre-mold. The pre-mold is subsequently roll-molded to form the elastomeric article having a preselected configuration.

A system incorporating the subject method generally comprises a surge bin; a heated conveyor assembly coupled to the surge bin; a mechanism coupled to the heated conveyor assembly for introducing a predetermined quantity of an additive composition into the heated conveyor assembly; an extruder assembly operably coupled to the heated conveyor assembly; and a roll mold assembly operably coupled to the extruder assembly. The surge bin regulates the release therefrom of a comminuted feedstock composition. The heated conveyor assembly transports therethrough the comminuted composition released from the surge bin, and includes a heating unit for heating the comminuted composition during this transport. The extruder assembly transforms the feedstock and additive compositions into a viscous compound composition pre-mold, and includes an elongate screw feed member rotatably disposed within an extruder barrel member. The extruder barrel member has defined therein an extrusion chamber substantially partitioned by at least one mixing block portion extending transaxially from the screw feed member. The roll mold assembly imparts to the viscous compound composition pre-mold the configuration preselected for the article being fabricated.

DETAILED DESCRIPTION OF THE PREFERRED EMBODIMENTS

Figures 1, 1A:
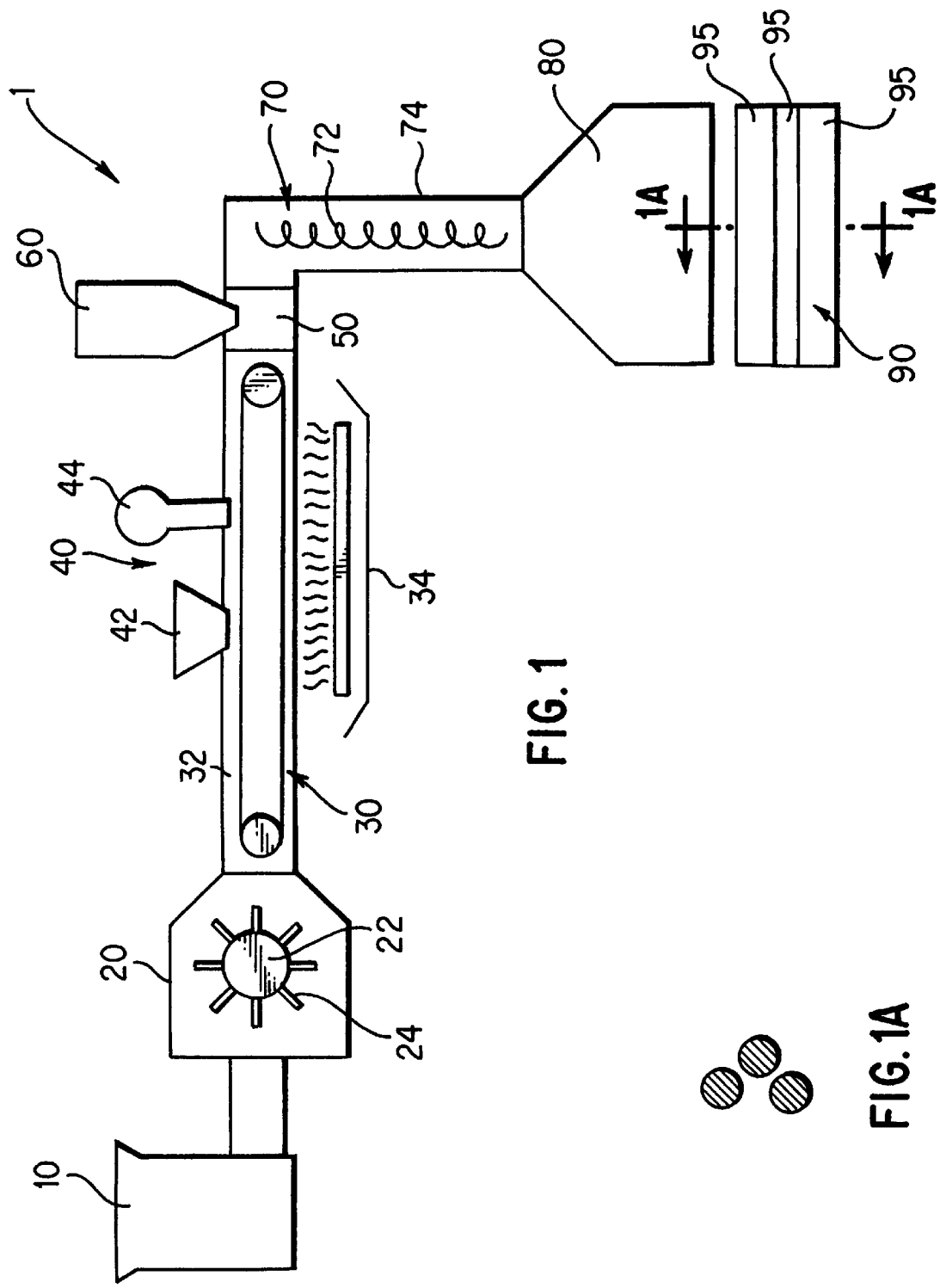
FIG. 1 is an illustrative schematic diagram of an embodiment of the present invention.
FIG. 1A is a cross-sectional view of the roll mold assembly shown in FIG. 1.

Turning now to FIG. 1, there is illustrated a preferred embodiment of the subject system 1 for fabricating elastomeric articles. System 1 generally includes a supply 10 of a comminuted rubber composition, a surge bin 20, a heated enclosed conveyor assembly 30, an additive introduction assembly 40, transfer piping 50, a plastic composition feed unit 60, a processing extruder assembly 70, a collection unit 80, and a roll mold assembly 90. Collectively, these components implement a continuous, in-line process whereby a comminuted rubber composition is sequentially processed and combined with selected additive compositions to form a viscous thermoplastic elastomer compound which is then preferably roll-molded in substantially contemporaneous manner to form an elastomeric article in its desired final configuration.

Supply 10 may be a storage bin or any other containment mechanism from which a flow of pre-stored rubber composition may be released into surge bin 20. The rubber composition is in comminuted form, comminuted preferably to a size in the range between approximately 10 mesh and 200 mesh. The composition in accordance with the present invention may be either a virgin material or a recycled material such as crumb rubber which is made readily available by rubber tire recyclers. This rubber material serves essentially as a feedstock resin for the ensuing processing and molding steps.

Surge bin 20 receives the comminuted rubber composition from supply 10 and introduces it into heated conveyor assembly 30 in substantially regulated manner. Surge bin 20 preferably includes a rotating barrel portion 22 from which a plurality of paddle members 24 project to urge the rubber composition into conveyor assembly 30 at a predetermined volumetric rate. This regulation effected by surge bin 20 ensures sufficient heating of the rubber composition during its passage through heated conveyor assembly 30.

Upon introduction at a controlled rate into heated conveyor assembly 30, the comminuted rubber composition is loaded onto a conveyor 32 for advancement to extruder assembly 70 over a predetermined residence time. Conveyor 32 may be of a belt conveyor, or other known type of conveyor, construction suitable for supporting and smoothly conveying the load of rubber composition material introduced by surge bin 20. As it is advanced by conveyor 32, the comminuted rubber composition is heated by a heating unit 34 employing any known type of heating device such as an infrared tube, a microwave energy generator, fluid heat radiator, and the like. The conveyor's rate of advancement is preferably preset in light of the regulated rate of material introduction from surge bin 20 and the intensity and distribution of the heat generated by heating unit 34 to a value which affords the comminuted rubber composition being advanced a sufficient residence time within heated conveyor assembly 30 to attain a temperature of approximately 200° F. At approximately 200° F., the comminuted rubber composition retains its solid crumb form. During its heating within heated conveyor assembly 30, however, the rubber composition is at least partially devulcanized. Also during this heating process, the rubber composition is exposed to a preselected additive mixture which is introduced thereon during advancement on conveyor 32 by an introduction unit 40.

The preselected additive mixture may be of either a dry or wet form, or alternatively, a combination of both. In its dry form, the additive mixture is preferably a lignan type compound having a crosslinking agent incorporated therein. In its wet form, the additive mixture is preferably a material such as that made commercially available by Tyreplex Corporation of Downingtown, PA under the Tradename DP, containing a complex series of fatty acid compounds.

Introduction unit 40 includes one or both of a dry additive feed device 42 and a liquid additive pump 44, depending on the material state of the additive mixture to be introduced. Devices 42, 44 may be of any suitable type known in the art, and appropriate means are employed therewith to control the rate and/or amount of mixture material introduced thereby.

The material properties desired in the elastomeric article to be formed will determine the weight percentages at which the additive mixture is introduced onto the rubber composition advancing through heated conveyor assembly 30. Depending on the degree of flexibility/rigidity desired in the elastomeric article ultimately formed, for instance, an exemplary additive mixture may be introduced at weight percentages ranging approximately from ½ weight percent to 10 weight percent.

The additive mixture introduced tends to mix with the rubber crumbs as they are transported by conveyor unit 32. The rubber composition becomes homogeneously dispersed thereby to a predetermined extent prior to introduction into extruder assembly 70.

The homogeneous dispersion exiting heated conveyor assembly 30 is passed through transfer piping 50 to extruder assembly 70. A feed unit 60 is provided at an appropriate point near the entry port of extruder assembly 70 to either weight scale feed or volumetric feed a predetermined amount of a thermoplastic scrap material into the stream of the homogeneous dispersion material entering extruder assembly 70. The thermoplastic scrap material is of a recyclable type preferably in comminuted form. The combined homogeneous dispersion and thermoplastic scrap material are agitated, mixed and further heated during its transport through extruder assembly 70 to form a viscous plasticated compound composition. Preferably, such mixture of materials is heated to attain a temperature within the approximate range of 300° F. to 320° F. at the output thereof from extruder assembly 70.

The material properties of the thermoplastic scrap material introduced by feed unit 60 is generally such that its thermal absorption characteristic is different from that characterizing the homogeneous dispersion. In processes such as injection molding, a sufficiently long mold residence time would afford the proper combination of the thermoplastic scrap material with a rubber-containing material regardless of when or where it is introduced prior to the actual molding process. Where, as here, the proper combining must occur during passage through extruder assembly 70, the point at which the thermoplastic scrap material is introduced into the pre-processing stream is important. Feed unit 60 is therefore coupled to the pre-processing stream at a point carefully selected in this regard.

Extruder unit 70 includes at least one screw-type feed member 72 axially disposed within an elongate extruder barrel 74. Extruder assembly 70 may employ any number of such screw feed member 72 and extruder barrel 74 combinations disposed, preferably, in parallel configuration. Extruder assembly 70 is provided with any of numerous in situ heating means known in the art. For instance, screw feed member 72 may be heated in any known manner such as by electrical excitation, or by the circulation therethrough of steam or a heated fluid. The extruder barrel 74 may also be alternatively, or additionally, heated by electrical excitation or by the internal passage therethrough of steam, a heated oil, or the like.

Screw feed member 72 and extruder barrel 74 are each formed of a suitable material having the strength, rigidity, and durability to withstand the loads and material processing environment to which they are continually exposed for significant lengths of time. They are each formed of a material that is also of sufficient thermal conductivity to effect the efficient transfer and distribution of heat throughout the entirety of extruder assembly 70.

Figure 2A:
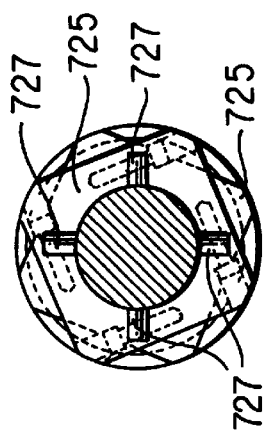
FIG. 2A is a cross-sectional view of a portion of the embodiment of the extruder assembly shown in FIG. 2.
Figure 2:
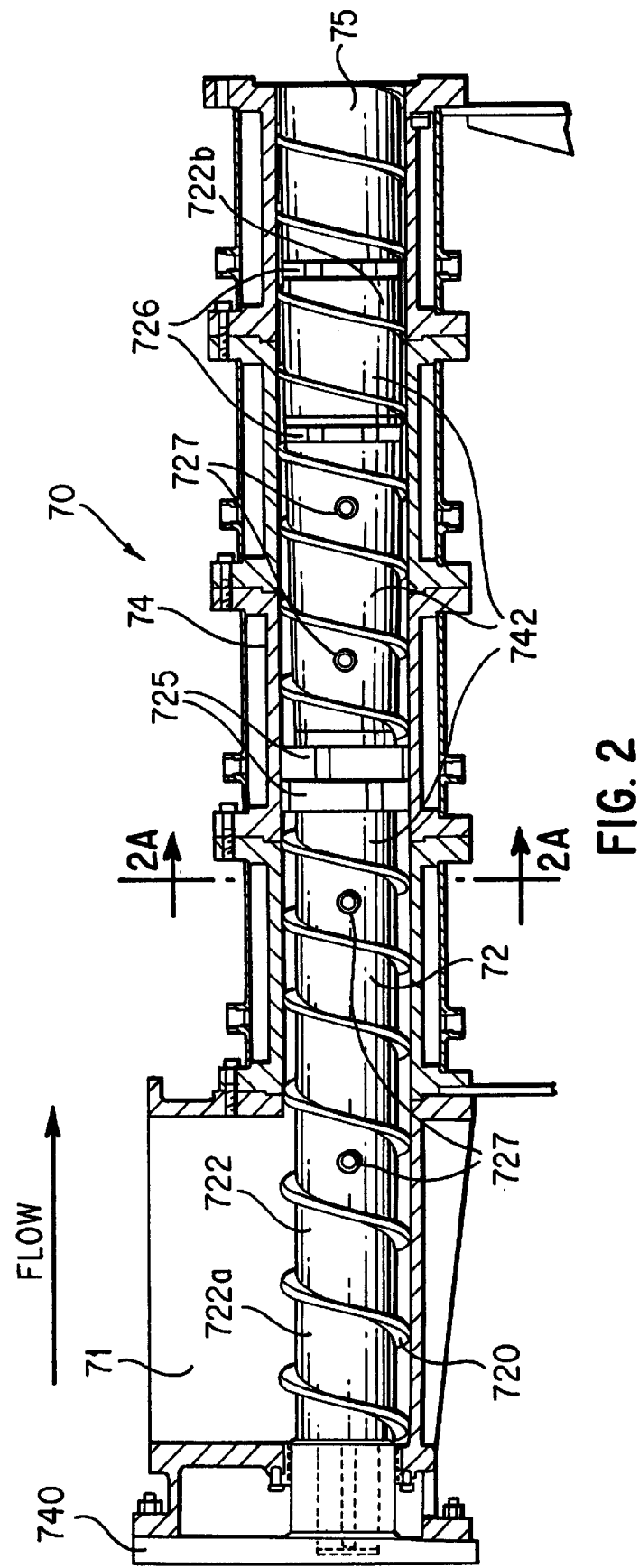
FIG. 2 is a sectional view of an embodiment of an extruder assembly of the present invention.

A detailed view of extruder assembly 70 in one embodiment formed in accordance with the present invention is shown in FIG. 2. As there shown, extruder assembly 70 preferably includes an elongate screw feed 72 coaxially extending within extruder barrel 74. Extruder barrel 74 is formed for easy construction by a plurality of barrel segments which may be coaxially joined by suitable fastening means as shown, and is retained within a housing structure 740. Screw feed 72 extends between an entry port 71 formed through housing structure 740 to an exit port 75 formed at a distal end of extruder barrel 74. Screw feed 72 is formed preferably with a screw blade portion 720 spirally disposed on a shaft member 722 whose diameter gradually increases from a first portion 722a to a second portion 722b adjacent exit port 75. Shaft member 722 is coupled to housing 740 in such manner that it is axially rotatable to cause the screw blade portion 720 to concurrently mix and advance through extruder barrel 74 the material introduced at entry port 71. The gradually increased diameter of shaft member 722 within the substantially constant-diameter extrusion chamber defined in extruder barrel 74 aids in subjecting the material within barrel 74 to an increased extrusion force by decreasing the volume of space through which the material must pass. Note that in other embodiments, a similar effect may be realized by other means—by, for instance, maintaining a constant diameter for shaft member 722 while varying the diametric dimension of the extrusion chamber accordingly.

Extruder assembly 70 is intended to mix and extrude the material introduced therein while inhibiting as much as possible any shearing of the material's constituents. To these ends, the extrusion chamber defined within extruder barrel 74 is substantially partitioned into a plurality of sub-chambers 742 by a plurality of mixing blocks 725, 726. As shown in the sectional view of FIG. 2A, mixing blocks 725, 726 are preferably formed as a planar block having a substantially square peripheral contour that is radially disposed about shaft member 722 of screw feed 720 such that the portions adjacent the corners thereof are configured to abut the internal surface of extruder barrel 74. Each block 725, 726 thus constricts a significant portion of the extrusion chamber of extruder barrel 74, leaving limited spaces beyond those of its peripheral edge portions not abutting the internal surface of extruder barrel 74 for passage of the given material. Mixing blocks 725, 726 may be provided, depending on the particular mixing and extruding effects desired, in varying numbers and with varying thicknesses. They may also be provided in adjacent combinations wherein the adjacent blocks 725 are disposed in angularly offset manner relative to one another.

The effect of mixing blocks 725, 726 during system operation is to induce a thorough mixing of the given material. Each block 725, 726 impedes the axial advancement along the extrusion chamber of a portion of the material, causing that portion to 'roll over' other portions for re-agitation therewith by action of the screw blade portion 720.

A plurality of radially projecting mixing pins 727 may be provided along the length of screw shaft member 722 to agitate and thereby enhance the mixing of the material to be extruded. The combined operation of these and other components of extruder assembly 70 culminates in the ejection at exit port 75 of a well-mixed and evenly-extruded viscous thermoplastic compound which may be collected, promptly molded, and cooled to form an elastomeric end product.

Turning back to FIG. 1, the viscous thermoplastic compound is received through exit port 75 by, preferably, an encapsulated pan unit 80 which allows the viscous compound to flow and collect into a substantially planar pre-mold of sheet-like material. Preferably, a plurality of heating coils or other heating mechanism is provided about the encapsulated pan structure 80 to prevent excessive solidification or hardening of the collected viscous compound.

A sheet-like pre-mold is thus formed in encapsulated pan unit 80. This pre-mold is then fed into a roll mold assembly 90 for final molding. Mold assembly 90, as further shown in FIG. 1A, includes a plurality of roller members 95 disposed and operated cooperatively in such manner as to impart a predetermined surface shape and contour to the pre-mold. Any suitable cooling (or heating) means known in the art may be employed with roll mold assembly 90 to either concurrently cool (or heat) the given material during its molding, or cool the material immediately following its molding.

Figure 3:
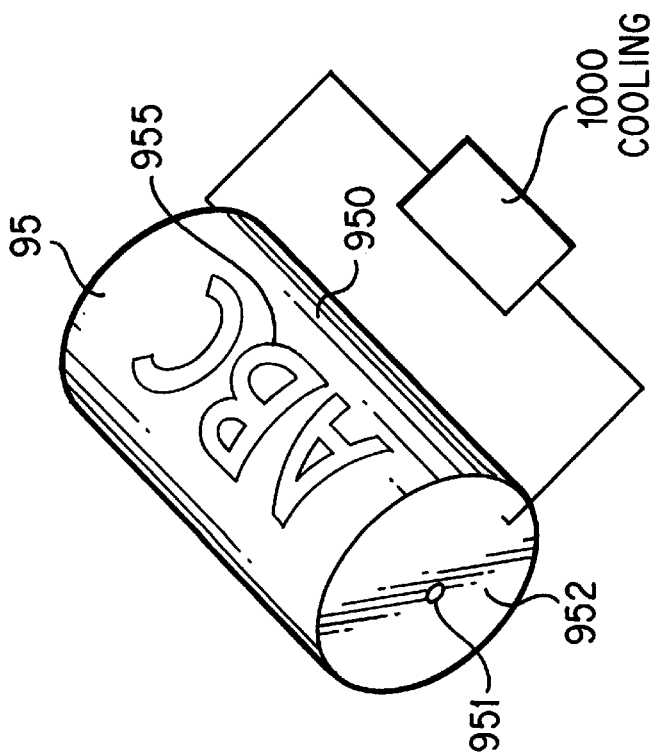
FIG. 3 is an embodiment of a portion of the roll mold assembly of the present invention; and, FIG. 4 is another embodiment of a portion of the roll mold assembly of the present invention.

Turning to FIG. 3, there is shown an embodiment of a roll member 95 employed in roll assembly 90. Roll member 95 is preferably coupled to a suitable cooling subsystem 1000, and includes an axial portion 951 which is configured either as a central passage through which one or more shaft members of a support structure may be inserted or, alternatively, as a projecting shaft segment which may be received by the supporting structure. Roll member 95 also includes a pair of axially-opposed end portions 952 between which extends a molding surface 950 having a molding pattern, or indicia, 955 of a predetermined contour, shape, and depth imprinted therein.

Figure 4:
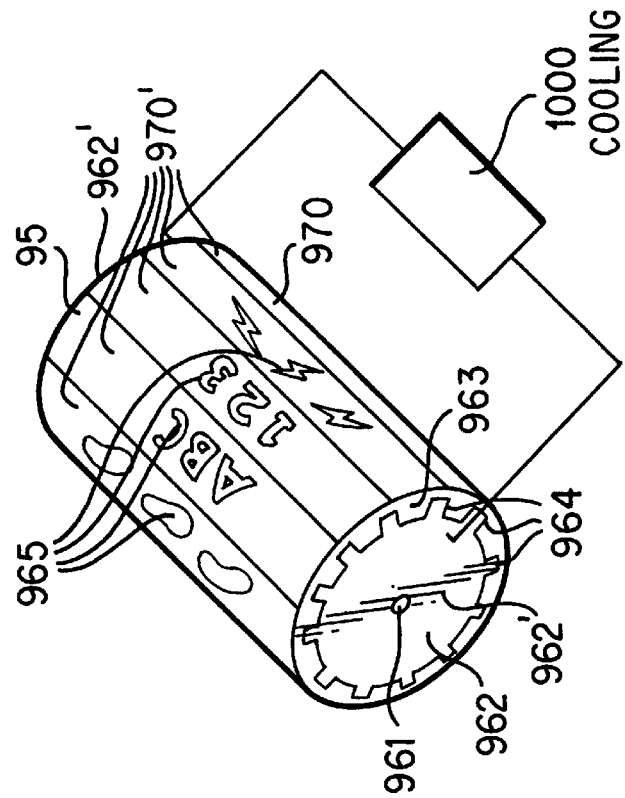

Turning next to FIG. 4, there is shown an alternate embodiment of a roll member 95 having an axial portion 961 and a pair of axially-opposed end portions 962. The molding surface 970 in this embodiment is formed on a sleeve member 963 removably coupled to a mold core 962 having axial end portions 962'. Sleeve member 963 is configured internally for keyed engagement with mold core 962 which is provided with a plurality of teeth projections extending radially at least from end portions 962'. This serves to prevent angular displacement of sleeve member 963 relative to mold core 962.

Preferably, mold core 962 extends axially between opposed end portions 962'. Its cross-section preferably remains constant along its axial extent for even, stable support of the entire molding face 970 of sleeve member 963.

The mold face 970 in this embodiment may also be formed by a plurality of mold surface plates 970', each imprinted with a predetermined mold pattern, or indicia, 965. The user may then alter a given portion of a mold pattern or indicia defined on a sleeve member 963 simply by replacing one or more plates 970'. Each plate 970' may be releasably secured to sleeve member 963 by any suitable means known in the art.

The mold face 950, 970 in each embodiment is formed of a material capable of withstanding the loads and harsh chemical and thermal environments typifying known roll-mold processes. For instance, it may be formed of such materials as steel, non-ferrous metal, ceramic, and the like.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described; certain features may be used independently of other features; and in certain cases, particular combinations of processing steps may be reversed or interposed, all without departing from the spirit or scope of the invention as defined in the appended Claims.

What is claimed is:

1. A method of fabricating an elastomeric article comprising the steps of:
    (a) providing a predetermined quantity of a comminuted rubber composition;
    (b) heating said comminuted rubber composition to a predetermined processing temperature for at least partial devulcanization thereof;
    (c) forming a homogeneous dispersion by combining with said rubber composition a predetermined quantity of an additive composition during said heating of said rubber composition, said step of forming said homogeneous dispersion includes the step of mixing an additive composition with said rubber composition, said additive composition including a lignan compound and a crosslinking agent;
    (d) mixing with said homogeneous dispersion a predetermined quantity of a plastic composition and heating to a predetermined extruding temperature to form a viscous compound composition; and,
    (e) mechanically processing said viscous compound composition to form said elastomeric article.

2. The method of fabricating an elastomeric article as recited in claim 1 wherein said step of mechanically processing said viscous compound composition includes the steps of:
    (a) extruding said viscous compound composition to form a substantially planar pre-mold; and,
    (b) roll-molding said pre-mold to form said elastomeric article having a preselected configuration.

3. The method of fabricating an elastomeric article as recited in claim 2 further comprising the step of substantially concurrently cooling said pre-mold during said roll-molding thereof.

4. The method of fabricating an elastomeric article as recited in claim 1 wherein said predetermined quantity of said additive composition forms a weight percentage of said homogeneous dispersion substantially within the approximate range between 0.5% and 10%.

5. The method of fabricating an elastomeric article as recited in claim 1 wherein said additive composition includes a series of fatty acid compounds.

6. The method of fabricating an elastomeric article as recited in claim 1 wherein said comminuted rubber composition is characterized by a mesh size substantially within the approximate range between 10 mesh and 200 mesh.

7. The method of fabricating an elastomeric article as recited in claim 1 wherein said predetermined processing temperature equals approximately 200 degrees F.

8. A method of fabricating an elastomeric article having a preselected configuration comprising:
    (a) providing a predetermined quantity of a comminuted rubber composition recovered from a recycling process;
    (b) preheating said comminuted rubber composition to a predetermined processing temperature for at least partial devulcanization thereof;
    (c) forming a homogeneous dispersion during said preheating by combining with said rubber composition a predetermined quantity of an additive composition, said additive composition including a lignan compound and a crosslinking agent;
    (d) mixing with said homogeneous dispersion a predetermined quantity of a plastic composition and heating to a predetermined extruding temperature to form a viscous compound composition;
    (e) extruding said viscous compound composition to form a substantially planar pre-mold; and,
    (f) roll-molding said pre-mold to form said elastomeric article having said preselected configuration.

9. The method of fabricating an elastomeric article as recited in claim 8 further comprising the step of substantially concurrently cooling said pre-mold during said roll-molding thereof.

10. The method of fabricating an elastomeric article as recited in claim 8 wherein said additive composition includes a series of fatty acid compounds.

* * * * *